(12) United States Patent
Park et al.

(10) Patent No.: US 7,728,616 B2
(45) Date of Patent: Jun. 1, 2010

(54) APPARATUS AND METHOD FOR TESTING PICTURE QUALITY OF LIQUID CRYSTAL DISPLAY

(75) Inventors: Won Sang Park, Gyeonggi-do (KR); Kee Han Uh, Gyeonggi-do (KR); Hae Young Yun, Gyeonggi-do (KR); Jae Ik Lim, Gangwon-do (KR); Seung Kyu Lee, Gyeonggi-do (KR); Sung Eun Cha, Gyeongsangnam-do (KR); Young Joo Chang, Gyeonggi-do (KR); Jae Young Lee, Gyeonggi-do (KR); Sang Woo Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 224 days.

(21) Appl. No.: 11/414,279

(22) Filed: Apr. 27, 2006

(65) Prior Publication Data

US 2007/0001710 A1    Jan. 4, 2007

(30) Foreign Application Priority Data

Jun. 29, 2005    (KR)    ................. 10-2005-0057126

(51) Int. Cl.
G01R 31/00    (2006.01)
(52) U.S. Cl. ..................................... 324/770
(58) Field of Classification Search ................. 324/770; 348/92

See application file for complete search history.

(56) References Cited

U.S. PATENT DOCUMENTS

| | | | | |
|---|---|---|---|---|
| 5,499,037 A | * | 3/1996 | Nakagawa et al. | 345/89 |
| 5,767,935 A | * | 6/1998 | Ueda et al. | 349/112 |
| 5,793,221 A | * | 8/1998 | Aoki | 324/770 |
| 5,886,760 A | * | 3/1999 | Ueda et al. | 349/95 |
| 6,177,955 B1 | * | 1/2001 | Downen et al. | 348/189 |
| 6,232,616 B1 | * | 5/2001 | Chen et al. | 250/559.45 |
| 6,606,116 B1 | * | 8/2003 | Poynter | 348/189 |
| 7,079,205 B2 | * | 7/2006 | Kuji | 349/112 |
| 7,110,104 B2 | * | 9/2006 | Choi et al. | 356/237.1 |
| 2002/0093583 A1 | * | 7/2002 | Ito | 348/373 |
| 2005/0030444 A1 | * | 2/2005 | Fujiwara et al. | 349/64 |

FOREIGN PATENT DOCUMENTS

| | | |
|---|---|---|
| JP | 2004-180142 | 6/2004 |
| KR | 10-2002-0056766 | 7/2004 |
| KR | 10-2002-0030645 | 4/2005 |

* cited by examiner

*Primary Examiner*—Ha Tran T Nguyen
*Assistant Examiner*—Roberto Velez
(74) *Attorney, Agent, or Firm*—Cantor Colburn LLP

(57) ABSTRACT

Disclosed is a picture quality testing apparatus and method of a liquid crystal display which can measure at least any one of gray inversion and color shift. An apparatus for testing the picture quality of a liquid crystal display includes a liquid crystal display for displaying a test pattern, an image pickup device for photographing the test pattern of the liquid crystal display, a measurer for measuring the transmittance of the test pattern photographed by the image pickup device, and a rotating means for rotating at least one of the liquid crystal display and the image pickup device while the image pickup device photographs the test pattern.

26 Claims, 12 Drawing Sheets

|  | WHITE | RED | GREEN | BLUE |
|---|---|---|---|---|
| INPUT PATTERN | | | | |
| 0 DEGREES | | | | |
| 10 DEGREES | | | | |
| 20 DEGREES | | | | |
| 30 DEGREES | | | | |
| 40 DEGREES | | | | |

FIG.11

APPARATUS AND METHOD FOR TESTING PICTURE QUALITY OF LIQUID CRYSTAL DISPLAY

BACKGROUND OF THE INVENTION

1. Field of the Invention

The present invention relates to an apparatus and method for testing the picture quality of a liquid crystal display, and in particular, to a picture quality testing apparatus and method of a liquid crystal display which can measure at least any one of gray inversion and color shift.

2. Description of the Related Art

A liquid crystal display (LCD) displays images by controlling the light transmittance of a liquid crystal by an electric field. To this end, the LCD includes an LCD panel in which liquid crystal cells are arranged in the form of matrixes, and a driving circuit for driving the LCD panel.

The LCD panel includes a thin film transistor substrate and a color filter substrate which face each other, a liquid crystal injected between the two substrates, and a spacer for maintaining a cell gap between the two substrates.

The thin film transistor substrate has gate lines, data lines, thin film transistors formed with switching elements at the intersection of the gate lines and the data lines, pixel electrodes connected to the thin film transistors in the unit of liquid crystal cells, and an alignment film coated on those whole elements. The gate lines and data lines receive signals from the driving circuit through their respective pads. The thin film transistors provide the pixel electrodes with pixel signals supplied to the data lines in response to scan signals supplied to the gate lines.

The color filter substrate includes color filters formed in the unit of liquid crystal cells, a black matrix for separating the color filters from one another and reflecting external light, a common electrode for supplying a reference voltage to the liquid crystal cells, and an alignment film coated on those whole elements.

In a conventional LCD, there frequently occur gray inversion that a gray level is inverted and color shift that color is changed when its screen moves in up/down directions or in right/left directions. However, since there are no definite ways of testing the gray inversion and color shift, those phenomena are felt and evaluated through the human eyes. Therefore, an apparatus which is capable of measuring the gray inversion and color shift has been in demand.

SUMMARY OF THE INVENTION

It is, therefore, an object of the present invention to provide a picture quality testing apparatus and method of an LCD which can measure at least any one of gray inversion and color shift.

In accordance with an aspect of the present invention, there is provided an apparatus for testing the picture quality of an LCD, including an LCD for displaying a test pattern, an image pickup device for photographing the test pattern of the LCD, a measurer for measuring the transmittance of the test pattern photographed by the image pickup device, and a rotating means for rotating at least one of the LCD and the image pickup device while the image pickup device photographs the test pattern.

Preferably, the LCD displays a test pattern of gray levels $(2^i-1)$ to $(2^j-1)$ (where i and j are positive integrals including zero).

The LCD displays a test pattern of at least one of white, blue, green, red, cyan, magenta, and yellow.

The image pickup device is a charge-coupled device (CCD) camera.

The measurer measures a viewing angle at which the transmittance of light on the LCD looks different from actual transmittance.

The measurer measures a viewing angle at which at least one of gray inversion and color shift of the test pattern occurs.

The at least one of the color shift and gray inversion occurs up to a region of one-third toward the interior of the LCD panel from the opposite side of a region where a pad supplying a driving signal to at least one of the data lines and gate lines is formed.

The rotating means rotates the LCD in at least one of up/down and right/left directions within the photographing range of the image pickup device.

In accordance with another aspect of the present invention, there is provided an apparatus for testing the picture quality of an LCD, including an LCD for displaying a test pattern with at least two gray levels, an image pickup device for photographing the test pattern of the LCD, a measurer for measuring a viewing angle at which the transmittance of the test pattern looks different from actual transmittance, and a rotating means for rotating at least one of the LCD and the image pickup device while the image pickup device photographs the test pattern.

In accordance with still another aspect of the present invention, there is provided a method for testing the picture quality of an LCD, including the steps of displaying a test pattern on an LCD, photographing the test pattern while an image pickup device moves around the LCD, and measuring the transmittance of the test pattern.

Preferably, the step of displaying a test pattern displays a test pattern of gray levels $(2^i-1)$ to $(2^j-1)$ (where i and j are positive integrals including zero) on the LCD.

The step of displaying a test pattern displays a test pattern of at least one of white, blue, green, red, cyan, magenta, and yellow on the LCD.

The image pickup device is a charge-coupled device (CCD) camera.

The step of measuring the transmittance of the test pattern measures a viewing angle at which the transmittance of light displayed on the LCD looks different from actual transmittance.

The step of measuring the transmittance of the test pattern measures a viewing angle at which at least one of gray inversion and color shift of the test pattern occurs.

In accordance with a further aspect of the present invention, there is provided a method for testing the picture quality of an LCD, including the steps of displaying a test pattern on the LCD and simultaneously rotating the LCD, photographing the test pattern by using an image pickup device, and measuring the transmittance of the test pattern.

Preferably, the step of displaying a test pattern on the LCD and simultaneously rotating the LCD rotates the LCD in at least one of up/down and right/left directions within the photographing range of the image pickup device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to FIGS. 1 to 11.

Figure 1:
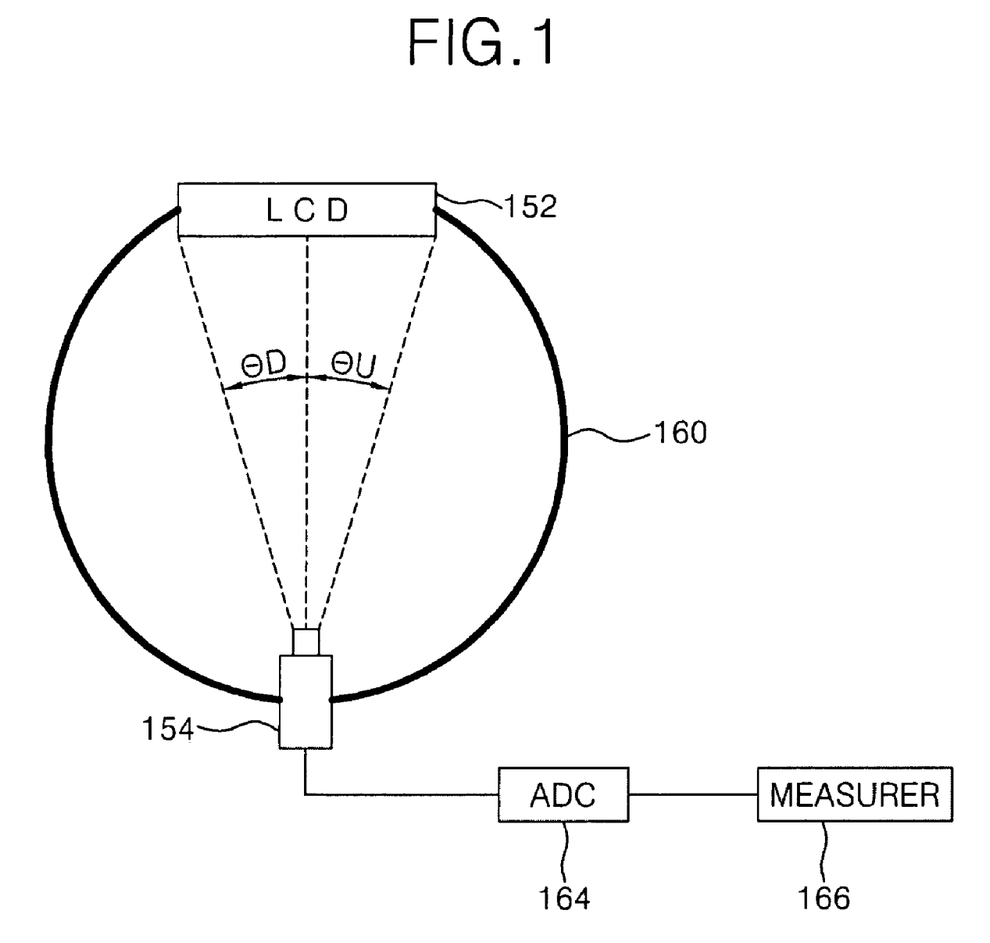
FIG. 1 is a block diagram illustrating a picture quality testing apparatus of an LCD according to a first embodiment of the present invention.

FIG. 1 is a block diagram illustrating a picture quality testing apparatus of an LCD according to the present invention.

Referring to FIG. 1, the picture quality testing apparatus according to the present invention includes an LCD 152, a test camera 154 for photographing an image displayed on the LCD 152, and a measurer 166 for determining the image photographed by the test camera 154.

Figure 2:
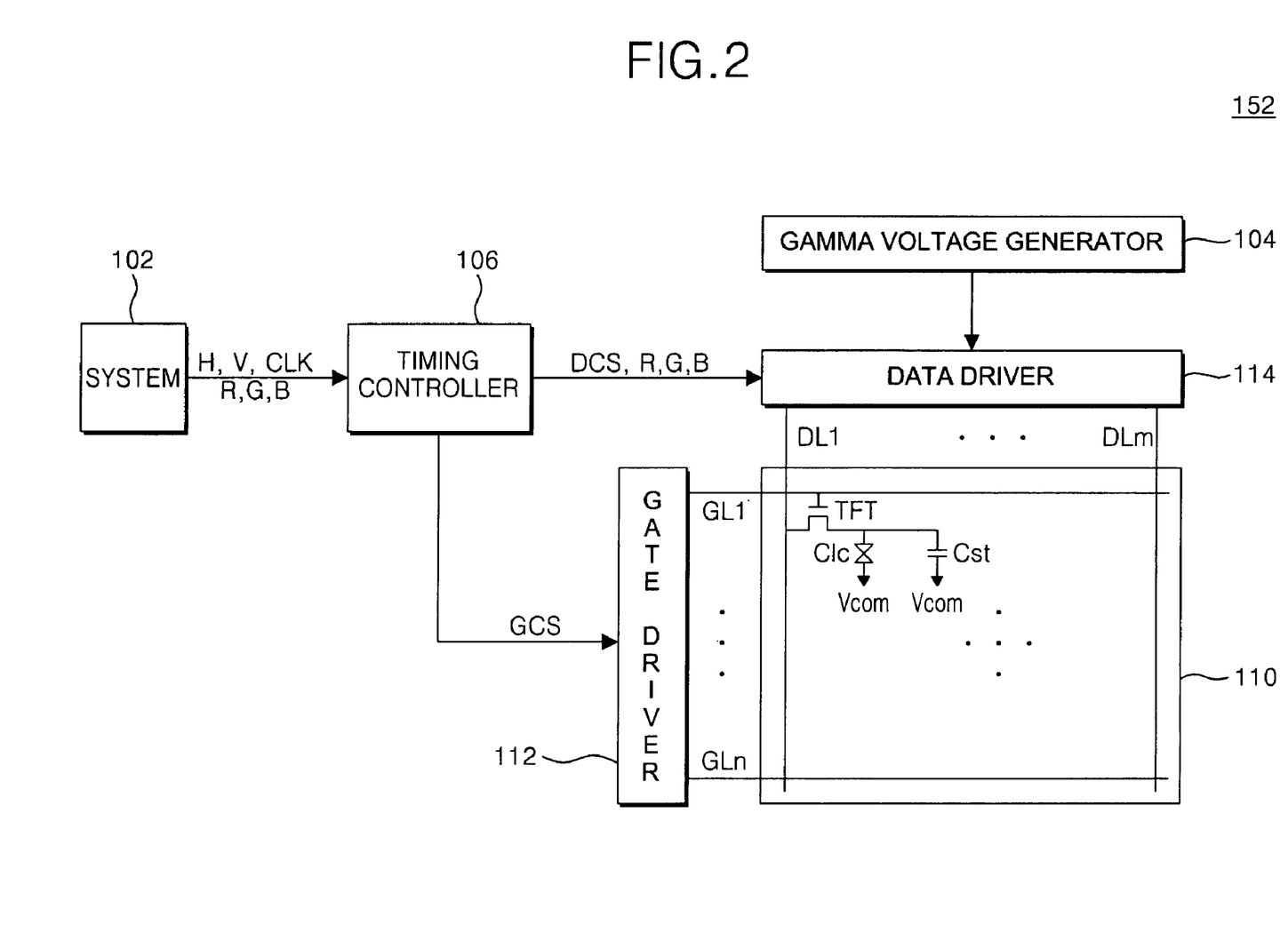
FIG. 2 is a block diagram illustrating the LCD shown in FIG. 1.

The LCD 152 includes, as illustrated in FIG. 2, an LCD panel 110, a data driver 114 for supplying data to data lines DL1 to DLm of the LCD panel 110, a gate driver 112 for supplying a scan signal to gate lines GL1 to GLn, and a timing controller 106 for controlling the data driver 114 and the gate driver 112 by using a synchronization signal provided from a system 102.

The system 102 provides the timing controller 106 with vertical and horizontal synchronization signals V and H, a clock signal CLK, and data R, G, B through an LVDS (Low-Voltage Differential Signaling) transmitter of a graphic controller.

The timing controller 106 rearranges digital video data R, G, B received from the graphic controller of the system 102 and supplies the rearranged data to the data driver 114.

Moreover, the timing controller 106 generates a gate control signal GCS for controlling the gate driver 112 and a data control signal DCS for controlling the data driver 114, by using the vertical and horizontal synchronization signal V and H and the clock signal CLK received from the graphic controller of the system 102.

The gate control signal GCS for controlling the gate driver 112 includes a gate start pulse GSP, a gate shift clock GSC, and a gate output enable signal GOE. The data control signal DCS for controlling the data driver 114 includes a source start pulse SSP, a source shift clock SSC, a source output enable signal SOE, and a polarity signal POL.

The data driver 114 converts the digital video data R, G, B into an analog gamma voltage corresponding to a gray level in response to the data control signal DCS, and supplies the analog gamma voltage to the data lines DL1 to DLm.

A gamma voltage generator 104 supplies the data driver 114 with a plurality of positive gamma voltages and negative gamma voltages so as to generate analog data signals.

The gate driver 112 sequentially supplies the scan pulse to the gate lines GL1 to GLn in response to the gate control signal GCS generated from the timing controller 106. Thus the gate driver 112 makes thin film transistors TFT connected to the gate lines GL1 to GLn be driven in the unit of gate lines.

The LCD panel 110 includes a plurality of liquid crystal cells Clc arranged in the form of matrixes at the intersection of the data lines DL1 to DLm and the gate lines GL1 to GLn. Each thin film transistor TFT connected to the liquid crystal cell Clc provides the liquid crystal cell Clc with a data signal supplied from the data lines DL1 to DLm in response to the scan signal supplied from the gate line. Storage capacitors Cst are connected to the liquid crystal cells Clc. In more detail, the storage capacitor Cst is formed between a pixel electrode of the liquid crystal cell Clc and a front gate line, or formed between the pixel electrode of the liquid crystal cell and a storage line, maintaining a voltage charged to the liquid crystal cell Clc at a constant level.

A test pattern is displayed on the LCD panel 110. The test pattern shows at least one of white, red, blue, green, cyan, magenta, yellow in gray levels $(2^i-1)$ to $(2^j-1)$ (where i and j are positive integrals including zero). For example, if the data driver 114 of 6 bits is used, the test pattern expresses gray levels 0 to 63. If the data driver 114 is 8 bits, the test pattern indicates gray levels of 0 to 255.

Figure 3:
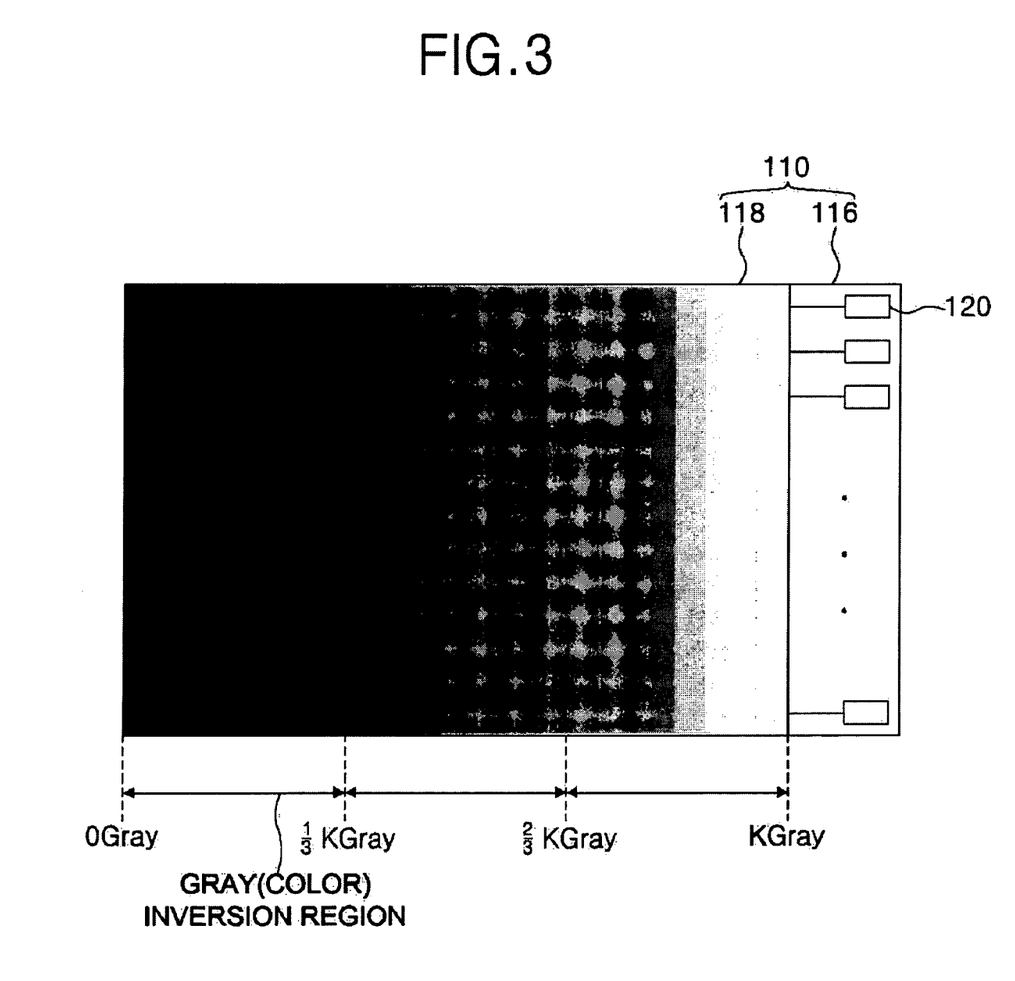
FIG. 3 is a block diagram illustrating an LCD panel shown in FIG. 2.

For this, the LCD panel 110 is divided into regions as many as the number of gray levels, and the test pattern shows different gray levels at the respective regions. As shown in FIG. 3, the test pattern shows a high gray level from a gray level 0 to K as a region gets nearer to a pad 120 which is exposed by a color filter substrate 118 and formed on a thin film transistor substrate 116. In this case, the pad 120 is connected to at least one of the gate driver 112 and the data driver 114 and supplies a driving signal to a signal line existing on the thin film transistor substrate 116.

The test camera 154 photographs the test pattern displayed on the LCD panel 110. The test camera 154 is a charge-couple device (CCD) camera for example.

Figure 4:
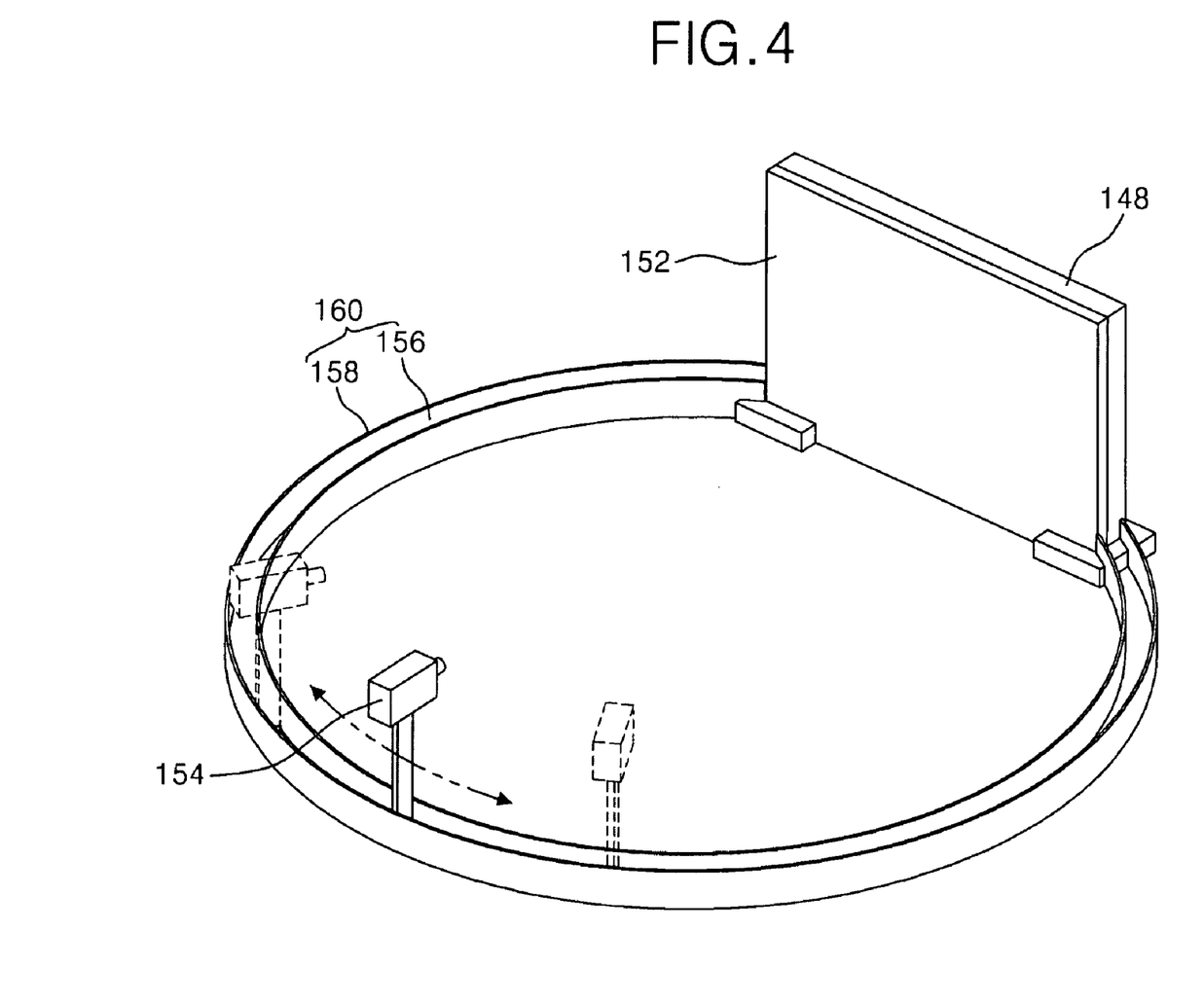
FIG. 4 is a perspective view for describing a state where a test camera rotates when the LCD shown in FIG. 1 is fixed.
Figure 5:
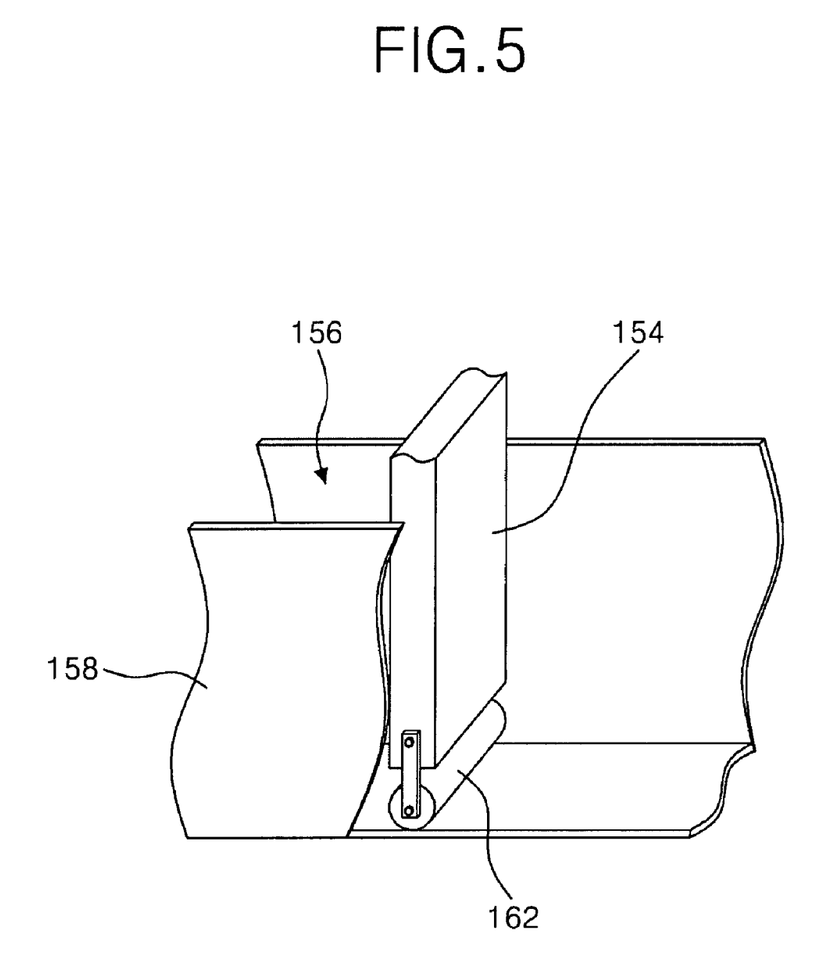
FIG. 5 is a perspective view specifically illustrating a rotating means and a guide connected to the test camera shown in FIG. 4.

The test camera 154, as shown in FIG. 4, moves along a guide part 160 and photographs the test pattern displayed on the LCD 152 fixed on a fixing part 148. The guide part 160 includes a guide groove 156, and a guide line 158 formed to form the guide groove 156. The guide groove 156 serves as a moving path of a rotating means, a roller 162 for example, connected to the test camera 154, as illustrated in FIG. 5, to move the test camera 154.

Figure 6:
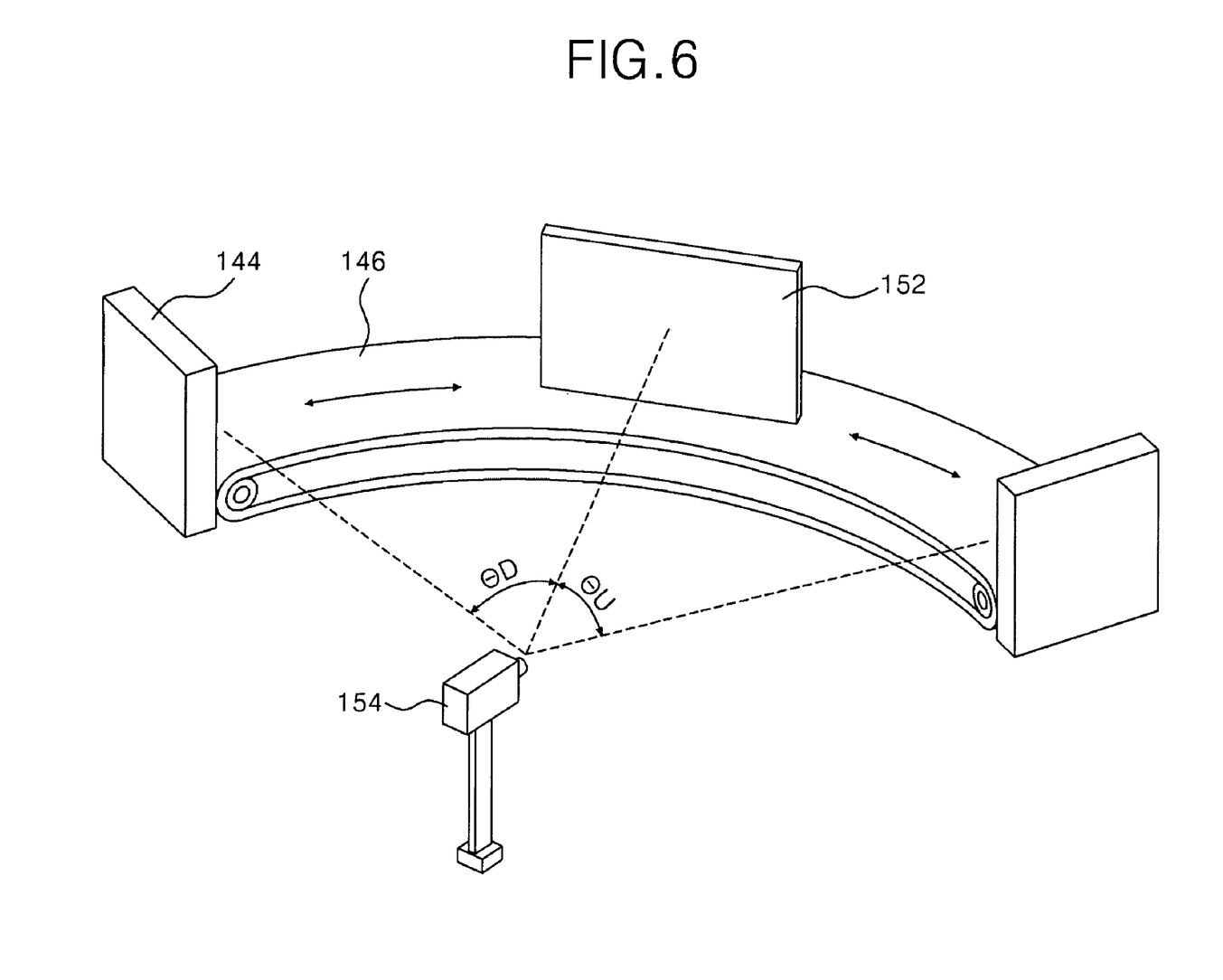
FIG. 6 is a perspective view for describing a state where an LCD rotates when a test camera shown in FIG. 1 is fixed.

Meanwhile, the LCD 152 may move while the test camera 154 is fixed as illustrated in FIG. 6. The LCD 152 moves in up/down directions or in left and right directions. The test camera 152 then photographs the test pattern displayed in the LCD 152. The LCD 152 is mounted on, for example, a conveyor belt 146 and moves along the traveling direction of the conveyor belt 146. A ridge 144 is located at both ends of the conveyor belt 146 to prevent the LCD 152 from falling down. The rotating means for rotating the test camera 154 or the LCD 152 is not limited to the roller 162 or the conveyor belt 146 described in the present description and other means for rotating the test camera 154 or the LDC 152 may be used.

Referring back to FIG. 1, an analog-to-digital converter (ADC) 164 converts an analog voltage value of the test pattern supplied from the test camera 154 into a digital value, and provides the digital value to the measurer 166.

The measurer 166 analyzes the test pattern of the digital value converted by the ADC 164 and measures an upper viewing angle θU or a lower viewing angle θD at which at least one of gray inversion and color shift occurs.

Thus the picture quality testing apparatus according to the first embodiment of the present invention detects a viewing angle at which gray inversion and color shift of the test pattern displayed on the LCD occur by using the test camera and the rotating means. Therefore, the inventive picture quality testing apparatus can accurately measure a viewing angle at which gray inversion and color shift occur without any errors in comparison with a method of measuring those phenomena through the human eyes. Moreover, the above picture quality testing apparatus can standardize a viewing angle at which the gray inversion and color shift occur according to the characteristics of the LCD.

Figure 7:
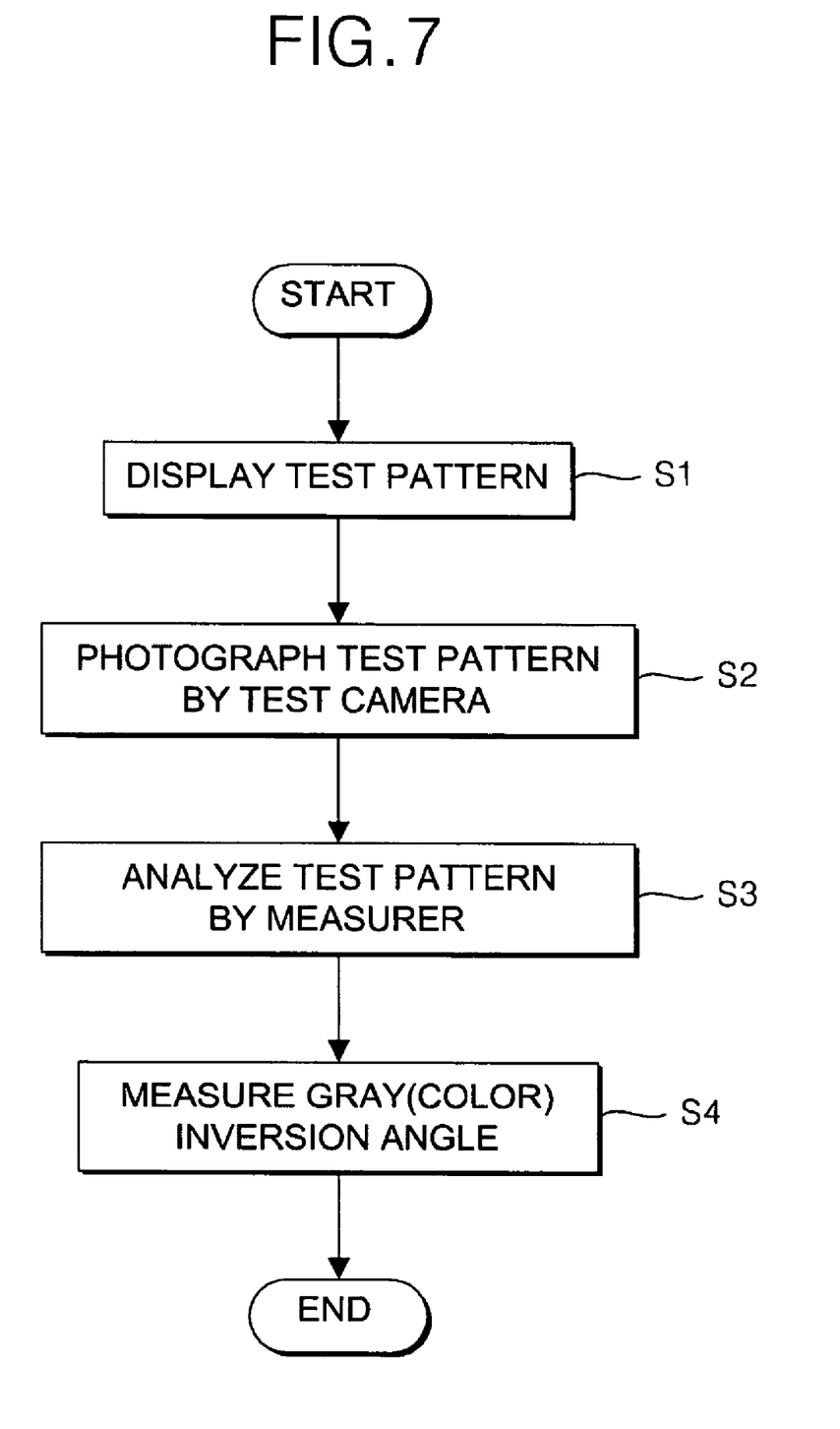
FIG. 7 is a flow chart illustrating a picture quality testing method of an LCD according to the present invention.

FIG. 7 is a flow chart illustrating a picture quality testing method of the LCD according to the present invention.

A test pattern is displayed on the LCD at step S1. The test pattern shows gray levels 0 to 63 when the 6-bit data driver 114 of is used, and gray levels 0 to 255 when the 8-bit data driver 114 is used.

The test pattern is photographed by the test camera 154, for example, a CCD camera at step S2. The test camera 154 or the LCD 152 rotates while the test camera 154 photographs the test pattern.

An analog voltage value of the test pattern photographed by the test camera 154 is converted into a digital value, and the converted digital value is supplied to the measurer 166. The measurer 166 analyzes the test pattern of the digital value at step S3 and measures an angle at which at least any one of gray inversion and color shift occurs at step S4.

By using this testing method, it can be noted that any one of the gray inversion and color shift occurs up to about one-third toward the interior of the LCD panel 110 from the opposite side of the pad 120 as shown in FIG. 3. The measuring result by the measurer 166 is that the upper viewing angle θU creating the gray inversion and color shift is about 30 degrees when a viewing angle compensated polarizer is used and about 15 degrees when a normal polarizer is used.

Figure 8:
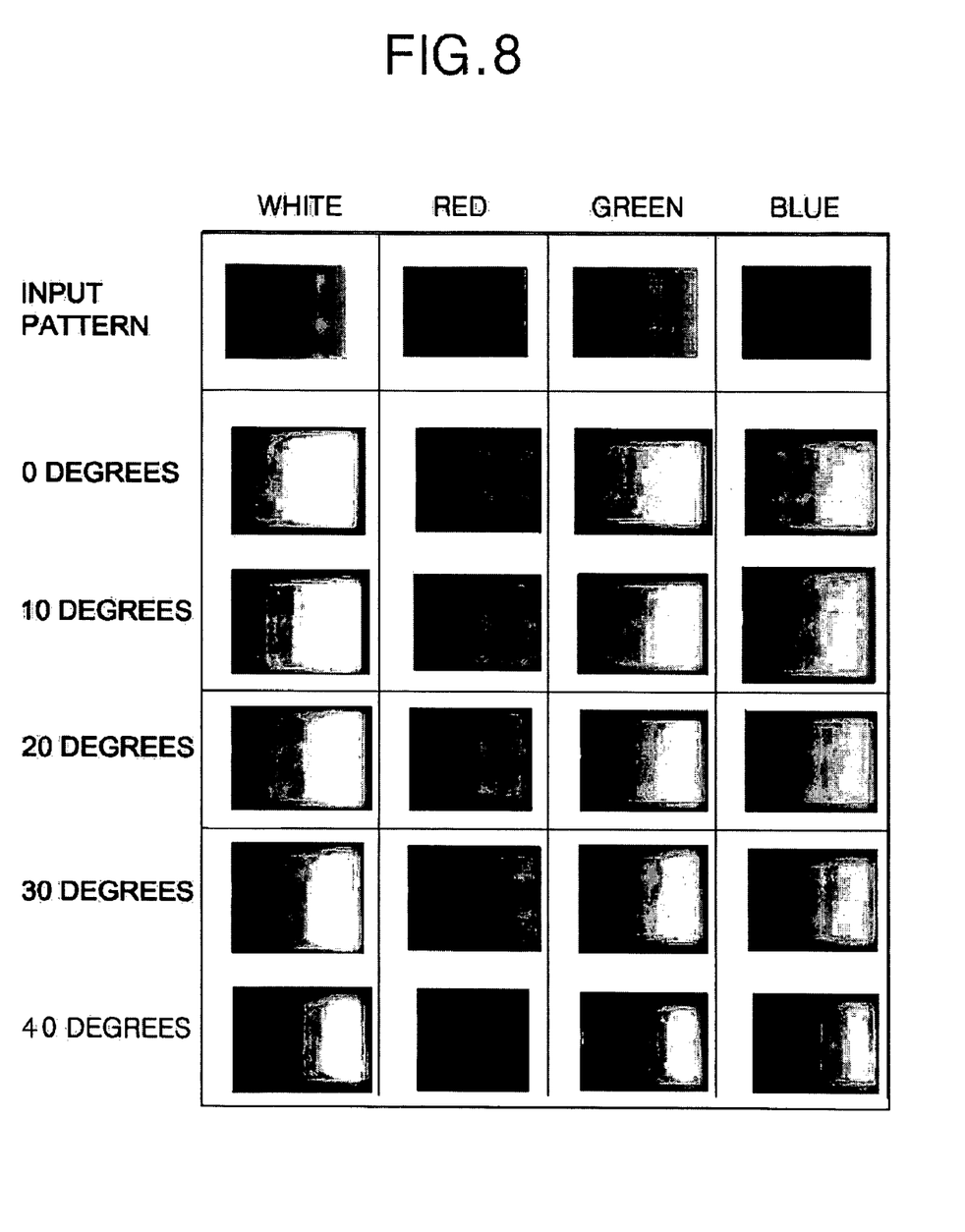
FIG. 8 illustrates a result of analyzing a test pattern of an LCD which displays black at a cell gap of 4.6 μm and a liquid crystal voltage of 3.4 V and uses a viewing angle compensated polarizer by using the picture quality testing apparatus of FIG. 1.

This will be described in detail with reference to FIGS. 8 and 9. FIG. 8 illustrates a result of analyzing the test pattern of the LCD which displays black at a cell gap of 4.6 μm and a pixel voltage of 3.4 V and uses a viewing angle compensated polarizer. As shown, if white, blue, red, and green test patterns in gray levels 0 to 63 are displayed, the gray inversion and color shift occur at an upper viewing angle of about 30 degrees or more.

Figure 9:
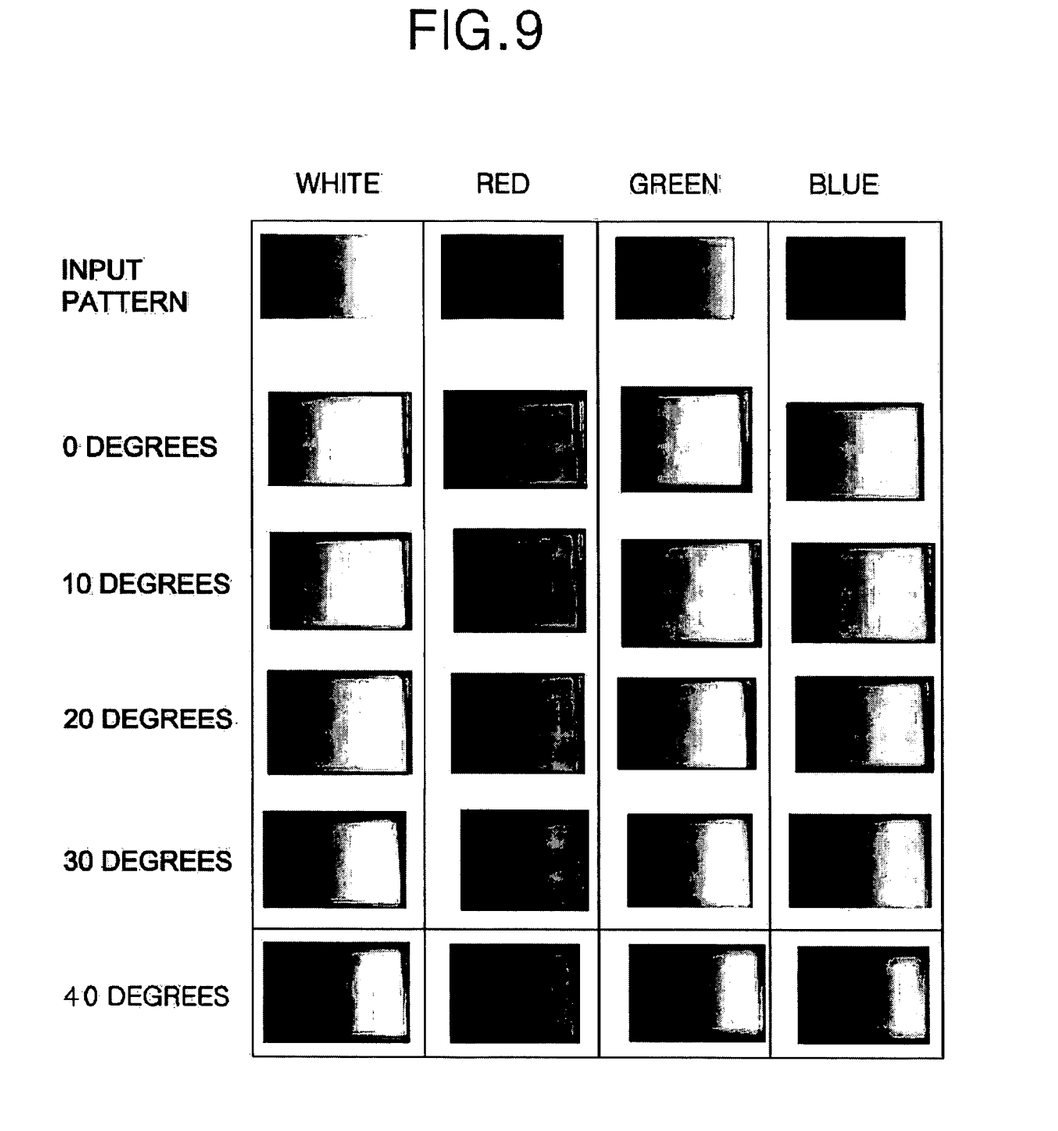
FIG. 9 illustrates a result of analyzing a test pattern of an LCD which displays black at a cell gap of 4.6 μm and a liquid crystal voltage of 3.4 V and uses a normal polarizer by using the picture quality testing apparatus of FIG. 1.

FIG. 9 illustrates a result of analyzing the test pattern of the LCD which displays black at a cell gap of 4.6 μm and a pixel voltage of 3.4 V and uses a normal polarizer. As shown, if white, blue, red, and green test patterns in gray levels 0 to 63 are displayed, the gray inversion and color shift happen at an upper viewing angle of about 15 degrees or more.

Figure 10A:
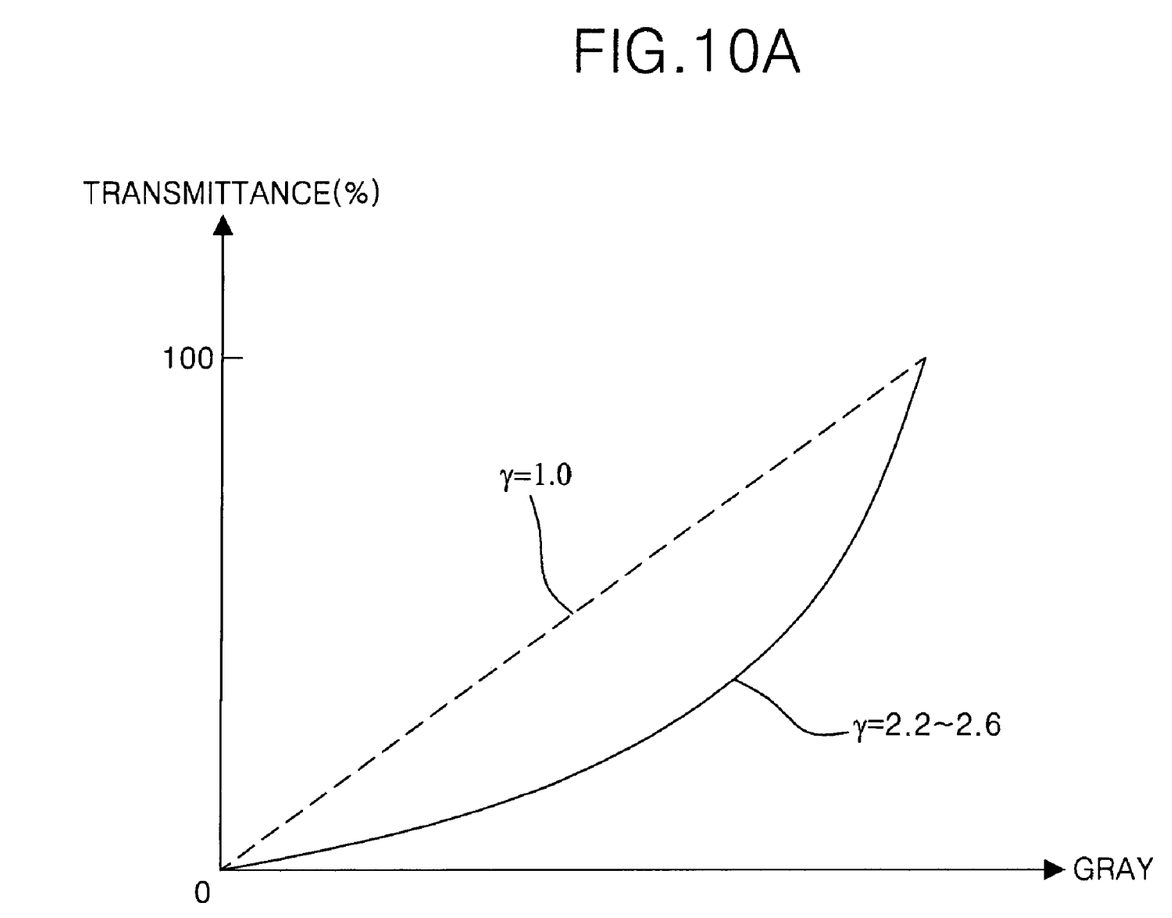
FIG. 10A is a graph illustrating the gray level-transmittance characteristics of an LCD.
Figure 10B:
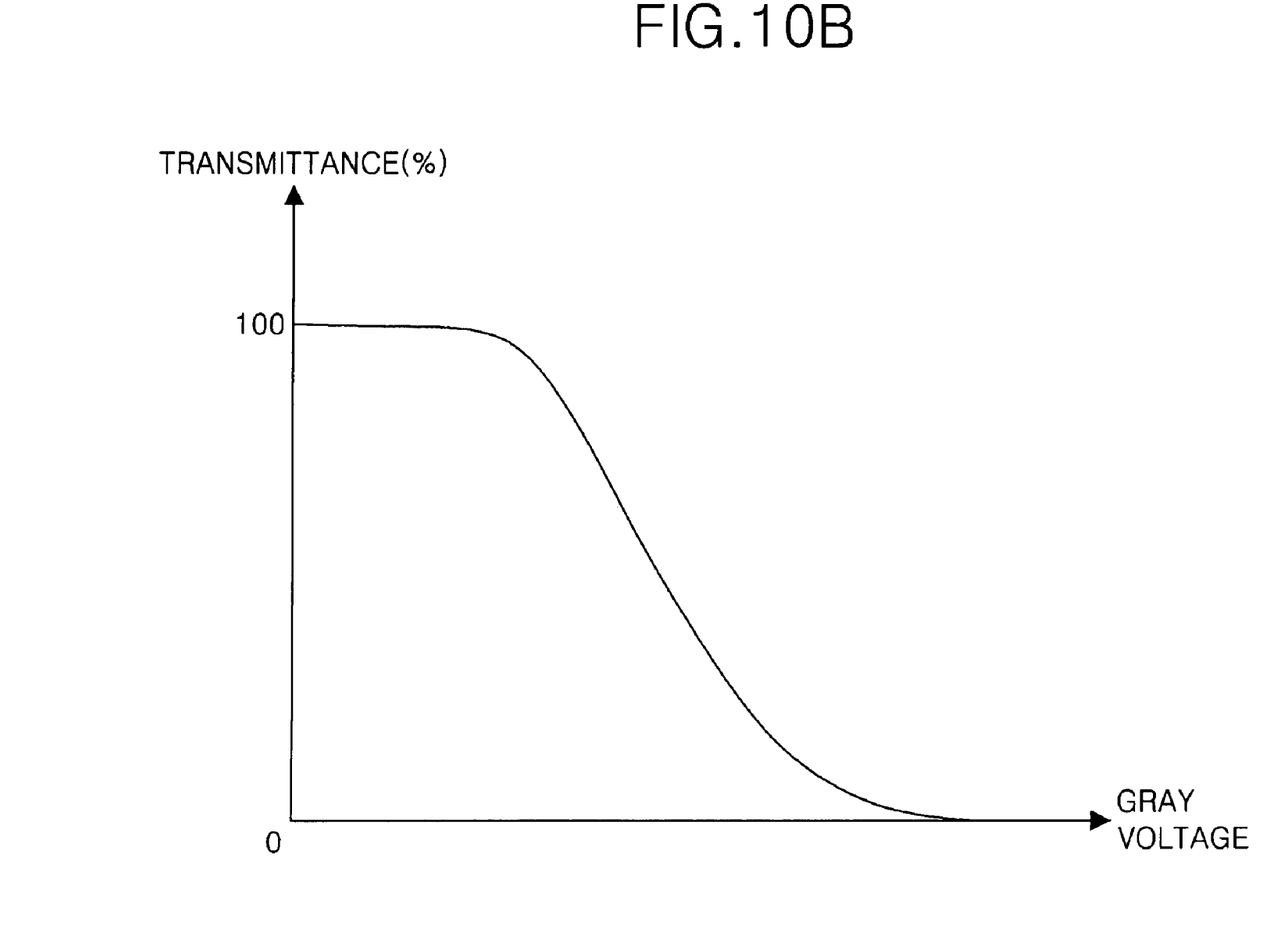
FIG. 10B is a graph illustrating the liquid crystal voltage-transmittance characteristics of an LCD.

Tables 1 to 4 shown below indicate simulation results of calculating the gray inversion. Prior to the description of the results, a gamma correction will now be explained in consideration of human visual characteristic. The LCD shows non-linear gray voltage-transmittance characteristics. In this case, it is difficult to express a medium gray level because the transmittance or brightness for a gray leans toward black and white gray without being maintained at regularly spaced intervals. Therefore, it is necessary to set the gray voltage appropriately at irregular intervals so as to ensure the linearity of a gamma characteristic. However, if the gamma value is 1.0, the human eye feels as if the variation of brightness according to gray levels doesn't have linearity. This is because the human visual perception does not have a linear characteristic proportional to the brightness, unlike an illuminometer. Hence, gamma correction should be conducted. When the LCD and human visual perception characteristics are considered, the gamma value which can obtain an optimal viewing angle and luminance is about 2.2 to 2.6. To obtain the corrected gamma value, the gray voltage for expressing gray levels should be rearranged as shown in FIG. 10B. However, it is not easy to fine out a voltage and transmittance of a medium gray level matched to the corrected gamma value. However, the voltage and transmittance around the medium gray level can be obtained through simulation results shown in Tables 1 to 4.

TABLE 1

An LCD having a 4.5 μm cell gap and using a viewing angle compensated polarizer

| Black voltage | Gray region | B (450 nm) | G (550 nm) | R (650 nm) | W |
|---|---|---|---|---|---|
| 3.0 | 17~27 | 24~32 | 24~30 | 22~30 | 24~32 |
| 3.1 | 17~26 | 24~30 | 24~30 | 22~30 | 22~30 |
| 3.2 | 15~25 | 22~30 | 22~28 | 22~30 | 22~28 |
| 3.3 | 13~23 | 20~26 | 20~26 | 20~26 | 20~26 |
| 3.4 | 12~21 | 20~26 | 18~26 | 18~26 | 18~26 |
| 3.5 | 11~20 | 18~24 | 18~24 | 18~24 | 18~24 |
| 3.6 | 9~18 | 16~22 | 16~22 | 16~22 | 16~22 |

As indicated in Table 1, if a white test pattern in gray levels 0 to 63 is displayed on the LCD panel 110 expressing black at a voltage of 3.4 volts, gray inversion occurs up to regions showing gray levels 12 to 21 at viewing angles of 18 to 26 degrees. If a blue test pattern in gray levels 0 to 63 is displayed on the LCD panel 110 of the same condition, color shift occurs up to regions showing gray levels 12 to 21 at viewing angles of 20 to 26 degrees. If a green (or red) test pattern in gray levels 0 to 63 is displayed on the LCD panel 110 of the same condition, color shift occurs up to regions showing gray levels 12 to 21 at viewing angles of 18 to 26 degrees.

TABLE 2

An LCD having a 4.6 μm cell gap and using a viewing angle compensated polarizer

| Black voltage | Gray region | B (450 nm) | G (550 nm) | R (650 nm) | W |
|---|---|---|---|---|---|
| 3.0 | 17~27 | 24~32 | 24~30 | 22~30 | 24~32 |
| 3.1 | 17~26 | 24~30 | 22~30 | 22~30 | 22~30 |
| 3.2 | 15~25 | 22~30 | 22~28 | 22~28 | 22~28 |
| 3.3 | 13~23 | 20~28 | 20~28 | 20~28 | 20~28 |
| 3.4 | 12~21 | 20~26 | 18~26 | 18~26 | 18~26 |
| 3.5 | 11~20 | 18~24 | 18~24 | 18~24 | 18~24 |
| 3.6 | 9~18 | 16~22 | 16~22 | 16~22 | 16~22 |

As indicated in Table 2, if a white test pattern in gray levels 0 to 63 is displayed on the LCD panel 110 expressing black at a voltage of 3.4 volts, gray inversion occurs up to regions showing gray levels 12 to 21 at viewing angles of 16 to 26 degrees. If a blue test pattern in gray levels 0 to 63 is displayed on the LCD panel 110 of the same condition, color shift occurs up to regions showing gray levels 12 to 21 at viewing angles of 20 to 26 degrees. If a green (or red) test pattern in gray levels 0 to 63 is displayed on the LCD panel 110 of the same condition, color shift occurs up to regions showing gray levels 12 to 21 at viewing angles of 18 to 26 degrees.

TABLE 3

An LCD having a 4.7 μm cell gap and using a viewing angle compensated polarizer

| Black voltage | Gray region | B (450 nm) | G (550 nm) | R (650 nm) | W |
|---|---|---|---|---|---|
| 3.0 | 17~27 | 24~30 | 24~30 | 22~30 | 24~32 |
| 3.1 | 17~26 | 22~30 | 22~30 | 22~30 | 24~30 |
| 3.2 | 15~25 | 22~30 | 22~28 | 22~28 | 22~28 |
| 3.3 | 13~23 | 20~28 | 20~28 | 20~28 | 20~28 |
| 3.4 | 12~21 | 18~26 | 18~26 | 18~26 | 18~26 |
| 3.5 | 11~20 | 18~24 | 18~24 | 18~24 | 18~24 |
| 3.6 | 9~18 | 16~24 | 16~24 | 16~24 | 16~24 |

As indicated in Table 3, if a white test pattern in gray levels 0 to 63 is displayed on the LCD panel 110 expressing black at a voltage of 3.4 volts, gray inversion occurs up to regions showing gray levels 12 to 21 at viewing angles of 18 to 26 degrees. If a blue test pattern in gray levels 0 to 63 is displayed on the LCD panel 110 of the same condition, color shift occurs up to regions showing gray levels 12 to 21 at viewing angles of 18 to 26 degrees. If a green (or red) test pattern in gray levels 0 to 63 is displayed on the LCD panel 110 of the same condition, color shift occurs up to regions showing gray levels 12 to 21 at viewing angles of 18 to 26 degrees.

TABLE 4

An LCD having a 4.6 μm cell gap and using a normal polarizer

| Black voltage | Gray region | B (450 nm) | G (550 nm) | R (650 nm) | W |
|---|---|---|---|---|---|
| 3.0 | 17~27 | 12~20 | 12~18 | 12~18 | 12~18 |
| 3.1 | 17~26 | 12~18 | 12~18 | 12~18 | 12~18 |
| 3.2 | 15~25 | 10~18 | 10~18 | 10~18 | 10~18 |
| 3.3 | 13~23 | 10~16 | 10~16 | 10~16 | 10~16 |
| 3.4 | 12~21 | 8~16 | 8~16 | 8~16 | 8~16 |
| 3.5 | 11~20 | 8~14 | 8~14 | 8~14 | 8~14 |
| 3.6 | 9~18 | 8~14 | 8~14 | 8~14 | 8~14 |

As indicated in Table 4, if a white test pattern in gray levels 0 to 63 is displayed on the LCD panel 110 expressing black at a voltage of 3.4 volts, gray inversion occurs up to regions showing gray levels 12 to 21 at viewing angles of 8 to 16 degrees. If a blue (or green or red) test pattern in gray levels 0 to 63 is displayed on the LCD panel 110 of the same condition, color shift occurs up to regions showing gray levels 12 to 21 at viewing angles of 8 to 16 degrees.

It can be noted that the simulation results are similar to values measured by the picture quality testing apparatus and method according to the present invention.

Figure 11:
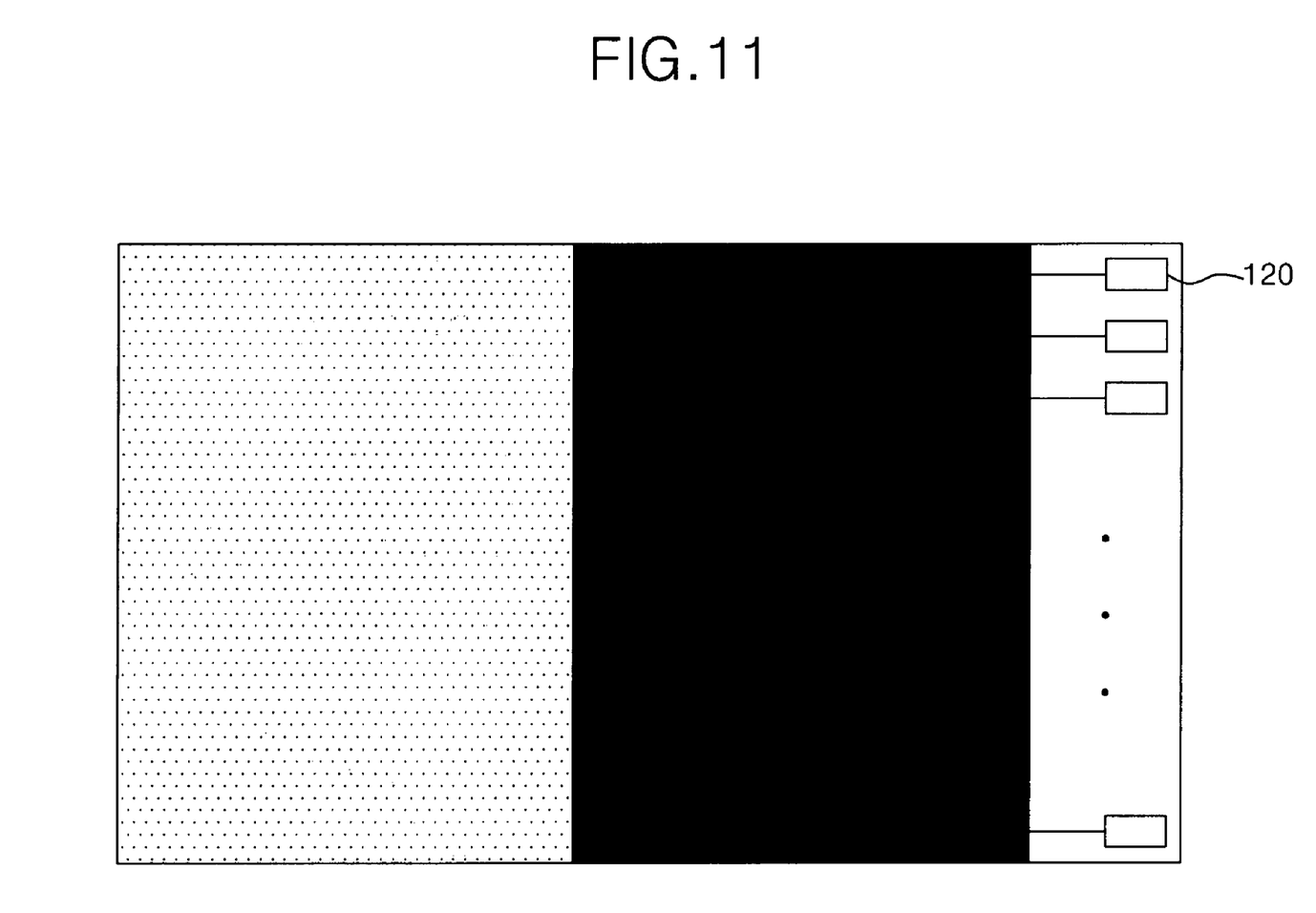
FIG. 11 is a block diagram illustrating a picture quality testing apparatus according to a second embodiment of the present invention.

FIG. 11 illustrates a picture quality testing apparatus according to a second embodiment of the present invention.

The picture quality testing apparatus shown in FIG. 11 has the same elements as that shown in FIG. 1 except that the test pattern displayed on the LCD panel expresses at least two gray levels, and thus the detailed description thereof will be omitted.

The test pattern displayed on the LCD panel 110 according to the second embodiment of the present invention expresses at least any one of white, red, blue, green, cyan, magenta and yellow in at least two gray levels.

For instance, if the 6-bit data driver 114 is used, the test pattern expresses gray levels 63 and 60. For this, the LCD panel 110 is divided into at least two regions while the picture quality is tested, so that the test pattern can express at least two gray levels. In this case, the test pattern selects gray levels creating color shift or gray inversion.

The test pattern is photographed by the test camera 154, a CCD for example. The test camera or the LCD rotates while the test camera photographs the test pattern.

An analog voltage value of the test pattern photographed by the test camera 154 is converted into a digital value and then the digital value is supplied to the measurer 166.

The measurer 166 analyzes the test pattern of the digital value, and measures an angle at which at least one of gray inversion and color shift occurs.

As described above, the picture quality testing apparatus according to the present invention detects a viewing angle at which the gray inversion and color shift of the test pattern displayed on the LCD occur while at least one of the LCD and the test camera rotates.

Therefore, the picture quality testing apparatus and method can accurately measure a viewing angle at which the gray inversion and color shift occur without any errors in comparison with a method of measuring those phenomena through the human eye.

Moreover, the picture quality testing apparatus can standardize a viewing angle at which the gray inversion and color shift occur according to the characteristics of the LCD by using the test camera and the rotating means.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for testing a picture quality, the apparatus comprising: a liquid crystal display which displays a test pattern; an image pickup device which photographs the test pattern of the liquid crystal display and obtains an analog voltage value of the test pattern; an analog-to-digital converter which receives the analog voltage value from the image pickup device and converts the analog voltage value from the image pickup device into a digital value; a measurer which measures a transmittance of the test pattern photographed by the image pickup device by receiving the digital value from the analog-to-digital converter and analyzing the test pattern of the digital value; a rotating means for rotating at least one of the liquid crystal display and the image pickup device while the image pickup device photographs the test pattern; and a guide part about which the at least one of the liquid crystal display and the image pickup device rotate while the image pickup device photographs the test pattern, wherein the measurer measures a viewing angle at which gray inversion of the test pattern occurs, based on the digital value, the guide part has a shape of at least a portion of a circle, and at least one of the liquid crystal display and the image pickup device rotates by moving along the guide part.

2. The apparatus as claimed in claim 1, wherein the liquid crystal display displays a test pattern of gray levels $(2^i-1)$ to $(2^j-1)$ (where i and j are positive integrals including zero).

3. The apparatus as claimed in claim 1, wherein the liquid crystal display displays a test pattern of at least one of white, blue, green, red, cyan, magenta, and yellow.

4. The apparatus as claimed in claim 1, wherein the image pickup device is a charged-coupled device (CCD) camera.

5. The apparatus as claimed in claim 1, wherein the measurer measures a viewing angle at which a transmittance of light on the liquid crystal display looks different from an actual transmittance.

6. The apparatus as claimed in claim 5, wherein the measurer measures a viewing angle at which color shift of the test pattern occurs, based on the digital value.

7. The apparatus as claimed in claim 1, wherein the rotating means rotates the liquid crystal display in at least one of up/down and right/left directions within a photographing range of the image pickup device.

8. The apparatus as claimed in claim 6, wherein the liquid crystal display comprises:
a liquid crystal display panel which displays the test pattern;
a data driver which drives data lines of the liquid crystal display panel; and
a gate driver which drives gate lines of the liquid crystal display panel.

9. The apparatus as claimed in claim 8, wherein at least one of the color shift and gray inversion occurs up to a region of one-third toward an interior of the liquid crystal panel from an opposite side of a region where a pad which supplies a driving signal to at least one of the data lines and gate lines is formed.

10. A method for testing a picture quality of a liquid crystal display, comprising: displaying a test pattern on the liquid crystal display; photographing the test pattern while an image pickup device rotates around the liquid crystal display on a guide part; obtaining an analog voltage value of the photographed test pattern; converting the analog voltage value into a digital value; and measuring a transmittance of the photographed test pattern by analyzing the digital value, wherein the measuring the transmittance of the test pattern comprises measuring a viewing angle at which gray inversion of the photographed test pattern occurs, based on the digital value, the guide part has a shape of at least a portion of a circle, and the image pickup device rotates by moving along the guide part.

11. The method as claimed in claim 10, wherein the displaying the test pattern comprises displaying a test pattern of gray levels $(2^i-1)$ to $(2^j-1)$ (where i and j are positive integrals including zero).

12. The method as claimed in claim 11, wherein the displaying the test pattern comprises displaying a test pattern of at least one of white, blue, green, red, cyan, magenta, and yellow on the liquid crystal display.

13. The method as claimed in claim 10, wherein the image pickup device is a charge-coupled device (CCD) camera.

14. The method as claimed in claim 10, wherein the measuring the transmittance of the test pattern comprises measuring a viewing angle at which a transmittance of light displayed on the liquid crystal display looks different from an actual transmittance.

15. The method as claimed in claim 14, wherein the measuring the transmittance of the test pattern further comprises measuring a viewing angle at which color shift of the test pattern occurs.

16. A method for testing a picture quality of a liquid crystal display, comprising: displaying a test pattern on the liquid crystal display and simultaneously rotating the liquid crystal display about a guide part; photographing the test pattern by using an image pickup device; and obtaining an analog voltage value of the photographed test pattern; converting the analog voltage value into a digital value; and measuring a transmittance of the photographed test pattern by analyzing the digital value, wherein the measuring the transmittance of the photographed test pattern comprises measuring a viewing angle at which gray inversion of the test pattern occurs, based on the digital value, the guide part has a shape of at least a portion of a circle, and the liquid crystal display rotates by moving along the guide part.

17. The method as claimed in claim 16, wherein the displaying the test pattern on the liquid crystal display and simultaneously rotating the liquid crystal display comprises displaying a test pattern of gray levels $(2^i-1)$ to $(2^j-1)$ (where i and j are positive integrals including zero).

18. The method as claimed in claim 17, wherein the displaying the test pattern on the liquid crystal display and simultaneously rotating the liquid crystal display further comprises displaying a test pattern of at least one of white, blue, green, red, cyan, magenta, and yellow.

19. The method as claimed in claim 16, wherein the displaying the test pattern on the liquid crystal display and simultaneously rotating the liquid crystal display about the guide part comprises rotating the liquid crystal display in at least one of up/down and right/left directions within a photographing range of the image pickup device.

20. The method as claimed in claim 16, wherein the measuring the transmittance of the test pattern comprises measuring a viewing angle at which a transmittance of light displayed on the liquid crystal display looks different from an actual transmittance.

21. The method as claimed in claim 20, wherein the measuring the transmittance of the test pattern further comprises measuring a viewing angle at which color shift of the test pattern occurs.

22. An apparatus for testing a picture quality comprising: a liquid crystal display which displays a test pattern with at least two gray levels; an image pickup device which photographs the test pattern of the liquid crystal display and obtains an analog voltage value of the test pattern; an analog-to-digital converter which receives the analog voltage value from the image pickup device and converts the analog voltage value from the image pickup device into a digital value; a measurer which receives the digital value from the analog-to-digital converter, analyzes the test pattern of the digital value and measures a viewing angle at which a transmittance of the test pattern looks different from an actual transmittance, based on the digital value; a rotating means for rotating at least one of the liquid crystal display and the image pickup device while the image pickup device photographs the test pattern; and a guide part about which the at least one of the liquid crystal display and the image pickup device rotate while the image pickup device photographs the test pattern, wherein the measurer measures a viewing angle at which gray inversion of the test pattern occurs, based on the digital value, the guide part has a shape of at least a portion of a circle, and at least one of the liquid crystal display and the image pickup device rotates by moving alone the guide part.

23. The apparatus as claimed in claim 22, wherein
the liquid crystal display displays a test pattern of at least one of white, blue, green, red, cyan, magenta, and yellow in gray levels $(2^i-1)$ to $(2^j-1)$ (where i and j are positive integrals including zero).

24. The apparatus as claimed in claim 22, wherein the measurer measures a viewing angle at which color shift of the test pattern occurs.

25. The apparatus as claimed in claim 22, wherein the rotating means rotates the liquid crystal display in at least one of up/down and right/left directions within a photographing range of the image pickup device.

26. The apparatus as claimed in claim 22, wherein the rotating means rotates the image pickup device within a photographing range of the liquid crystal display.

* * * * *